United States Patent [19]

Hartmann

[11] Patent Number: 6,018,782
[45] Date of Patent: Jan. 25, 2000

[54] FLEXIBLE BUFFERING SCHEME FOR INTER-MODULE ON-CHIP COMMUNICATIONS

[75] Inventor: Alfred C. Hartmann, Round Rock, Tex.

[73] Assignee: Advanced Micro Devices, Inc., Sunnyvale, Calif.

[21] Appl. No.: 08/892,415

[22] Filed: Jul. 14, 1997

[51] Int. Cl.$^7$ .............................. G06F 13/38; G06F 13/00
[52] U.S. Cl. .......................... 710/129; 710/131; 709/251
[58] Field of Search ......................... 395/200.81, 800.43, 395/311; 370/258, 403–406; 709/251; 712/43; 710/131, 160, 129

[56] References Cited

U.S. PATENT DOCUMENTS

| | | | |
|---|---|---|---|
| 4,468,734 | 8/1984 | Lanier et al. | 395/182.02 |
| 4,939,724 | 7/1990 | Ebersole | 370/407 |
| 5,191,652 | 3/1993 | Dias et al. . | |
| 5,383,191 | 1/1995 | Hobgood et al. . | |
| 5,394,389 | 2/1995 | Kremer | 370/223 |
| 5,539,747 | 7/1996 | Ito et al. | 370/234 |
| 5,546,403 | 8/1996 | Yamamoto et al. | 371/20.5 |
| 5,590,124 | 12/1996 | Robins | 370/258 |
| 5,761,516 | 6/1998 | Rostoker et al. | 395/733 |
| 5,859,983 | 1/1999 | Heller et al. . | |

OTHER PUBLICATIONS

Itano, et al "HIRB: A Hierarchical Ring Bus" University of Tsukuba, Japan, Proceedings of the Nineteenth Annual Hawaii International Conference on System Sciences, 1986, pp. 206–213.

Kubiatowicz et al, "The Alweife CMMU: Addressing the Multiprocessor Communications Gap," Extended Abstract for Hot Chips '94, 1994, pp. 1–3.

Kubiatowicz et al, "The Anatomy of a Message in the Alewife Multiprocessor," Proceedings of the International Conference on Supercomputing (ICS) 1993, pp. 195–206, Jul. 1993.

Gustavson, D.B., "Scalable Coherent Interface and Related Standards Projects," IEEE vol. 12, No. 1, pp. 10–22, Feb. 1992.

Cha, et al, "Simulated Behaviour of Large Scale SCI Rings and Tori," Depts. of Engineering and Computer Science, University of Cambridge, United Kingdom, pp. 1–21, Proceedings of 5th IEEE Symposium on Parallel and Distributed Processing, Dallas, Texas, Dec. 1993.

Franklin, et al, "ARB: A Hardware Mechanism for Dynamic Reordering of Memory References," IEEE Transactions on Computers, vol. 45, No. 5, May 1996, pp. 552–571.

*Primary Examiner*—Paul R. Myers
*Attorney, Agent, or Firm*—Gonley, Rose & Tayon, P.C.; Jeffrey C. Hood; Eric A. Stephenson

[57] ABSTRACT

A single chip integrated circuit comprises a plurality of modules interconnected in an on-chip network. The modules are processors or memory devices or hybrids. An inter-module link provides an electrical path for data communication among the modules. The modules are connected to the inter-module link by inter-module ports, with at least one inter-module port coupled between an associated module and the inter-module link. The inter-module link electrically couples the inter-module ports and provides a communications pathway between the modules. Each inter-module port provides a common, universal interface to any of the modules, i.e., modules of different types are connectable to any inter-module port. Each inter-module port operates to receive data from the inter-module link, to determine if the data from the inter-module link is addressed to the associated module, to provide the data from the inter-module link to the associated module if the inter-module port determines that the data from the inter-module link is addressed to the associated module, to accept data from the associated module for transmission on the inter-module link, and to transmit the data from the associated module on the inter-module link. The on-chip network may also include an inter-module network switch for joining circuits of the inter-module link and routing data packets from one inter-module links to another or an inter-chip network bridge to join two single chip integrated circuits into a single communications network and route data packets from modules on one computer chip to modules on another computer chip.

35 Claims, 5 Drawing Sheets

FIG. 5

FLEXIBLE BUFFERING SCHEME FOR INTER-MODULE ON-CHIP COMMUNICATIONS

BACKGROUND OF THE INVENTION

1. Field of the Invention

The present invention is related to semiconductor integrated circuits, and more particularly to a system for connecting modules on an integrated circuit in an on-chip network using a flexible buffering scheme.

2. Description of the Related Art

Computer systems have traditionally comprised a system unit or housing which encloses a plurality of electrical components comprising the computer system. A computer system typically includes a motherboard which is configured to hold the microprocessor and memory and the one or more busses used in the computer system. The motherboard typically comprises a plurality of computer chips or electrical components including intelligent peripheral devices, bus controllers, processors, bus bridges, etc.

More recently, computer systems are evolving toward an integration of functions into a handful of computer chips. This coincides with the ability of chip makers to place an increasingly large number of transistors on a single chip. For example, currently chip manufacturers are able to place up to ten million transistors on a single integrated circuit or monolithic substrate. It is anticipated that within several years chip makers will be able to place one billion transistors on a single chip. Thus, computer systems are involving toward comprising a handful of computer chips, where each computer chip comprises a plurality of functions. The integration of a plurality of modules or functions on a single computer chip requires an improved data transfer chip architecture. Also, due to the shorter distances and tighter integration of components on a chip, new data transfer architectures are necessary to take advantage of this environment. Therefore, an improved system and method is desired for including a plurality of different functions or modules on a single chip integrated circuit.

SUMMARY OF THE INVENTION

The present invention comprises a single chip integrated circuit with a plurality of modules interconnected in an on-chip network. An inter-module link provides an electrical path for data communication among the modules. The plurality of modules each perform operations. The modules are connected to the inter-module link by a plurality of inter-module ports, with at least one inter-module port coupled between an associated module and the inter-module link. The inter-module link electrically couples the inter-module ports, and the inter-module link is configured to provide a communications pathway between the modules. Each of the inter-module ports provides a common interface to any of the modules, i.e., modules of different types are connectable to any inter-module port. The on-chip network may also include an inter-module network switch for joining circuits of the inter-module link or an inter-chip network bridge to join two single chip integrated circuits into a single communications network.

An inter-module port couples a module to an inter-module link for communications between the plurality of modules. Each inter-module port includes an "off-ramp" demultiplexer for coupling to the inter-module link receiving data from the inter-module link, and an "on-ramp" multiplexer for coupling to the inter-module link and for providing data onto the inter-module link. The off-ramp demultiplexer is coupled to provide data to the on-ramp multiplexer for "through traffic". Each inter-module port also includes an input buffer coupled to the off-ramp demultiplexer, wherein the input buffer includes connections for coupling to the associated module. An output buffer is coupled to the on-ramp multiplexer, wherein the output buffer also includes connections for coupling to the associated module.

Each inter-module port operates to receive data from the inter-module link and determine if the data from the inter-module link is addressed to the associated module. The inter-module port provides the data from the inter-module link to the associated module if the inter-module port determines that the data from the inter-module link is addressed to the associated module. Each inter-module port also accepts data from the associated module for transmission on the inter-module link and transmits the data from the associated module on the inter-module link.

The off-ramp demultiplexer operates to receive data from the inter-module link and demultiplex that portion of the data intended for the module and provide that portion of the data intended for the module to the input buffer. The input buffer operates to receive and store the portion of the data intended for the module and provide that portion of the data to the module. The output buffer operates to receive and store data from the module and provide the data from the module to the on-ramp multiplexer. The on-ramp multiplexer operates to receive data from the module and multiplex that data from the module with other data received from the off-ramp demultiplexer to form multiplexed data and provide the multiplexed data to the inter-module link.

An inter-module network switch couples a plurality of inter-module links to provide a complete circuit for the transmission of data among the modules. Each inter-module network switch includes a plurality of connectors for connecting to the plurality of inter-module links, an input buffer and an output buffer for coupling to each of the associated inter-module links, and switching logic coupled to each of the input and output buffers, wherein the switching logic transfers communications from a first input buffer coupled to a first inter-module link to a second output buffer coupled to a second inter-module link. An inter-module network switch also includes a controller coupled to the switching logic for controlling operations of the switching logic. The controller reads the associated address of each data packet, determines the destination for the data packet, and directs the switching logic to route the data packet to its destination.

An inter-chip network bridge couples its associated computer chip to a second computer chip for the exchange of data. Each inter-chip network bridge includes a plurality of connectors for coupling to a plurality of corresponding connectors on the second computer chip, one or more output buffers which accept outgoing data destined for an address on the second computer chip, one or more input buffers which receive incoming data destined for an associated address on the associated computer chip, switching logic coupled to each of the output and input buffers and operable to transfer the outgoing data from a first output buffer to the second computer chip and to receive the incoming data from the second computer chip into a first input buffer, and a controller coupled to control the switching logic.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE EMBODIMENTS

The present invention comprises a single chip integrated circuit including a plurality of modules interconnected in an on-chip network.

Figure 1:
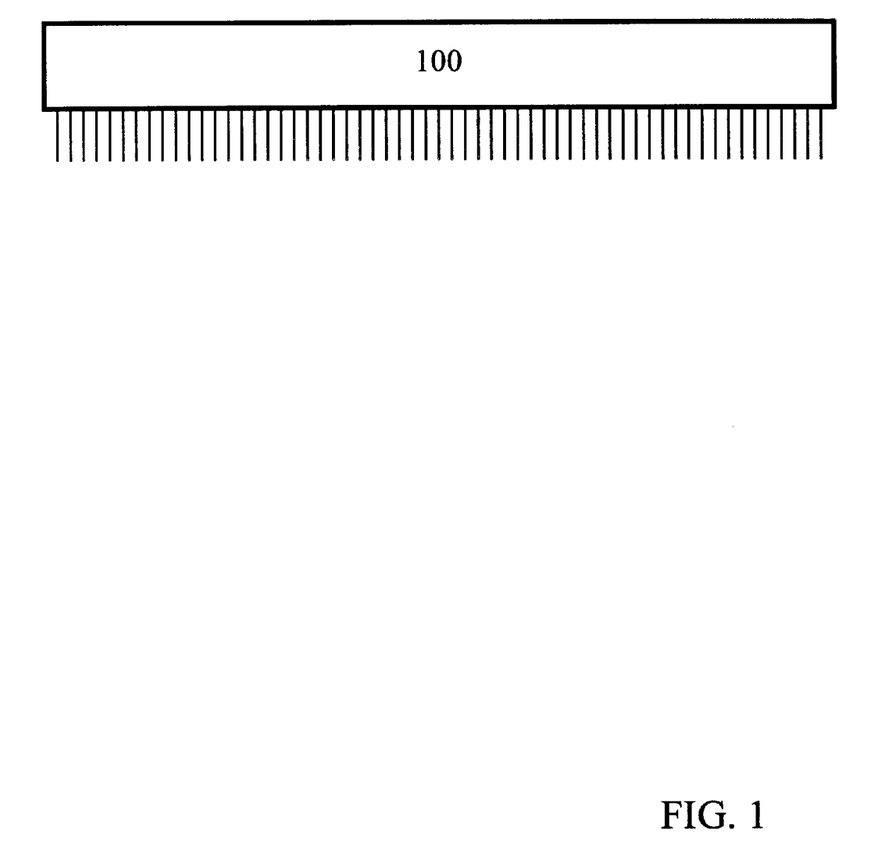
FIG. 1 illustrates a computer chip comprising an on-chip network according to the present invention.

FIG. 1—Computer Chip

Referring now to FIG. 1, a computer chip 100 is shown from a side view. Computer chip 100 preferably comprises a monolithic silicon substrate comprising a plurality of transistors, according to the present invention. The computer chip may also use gallium arsenide (GaAs) or another suitable semiconductor material. Although shown as a ceramic socket mount pin grid array (PGA) package, the computer chip 100 may be packaged in any of various ways, including as a surface mount, socket mount, or insertion/socket mount. Materials used in the packaging of computer chip 100 may include ceramic packages, leadless chip carrier packages (LCC), glass-sealed packages, or plastic packages. Actual type of chip package for computer chip 100 may include, ceramic quad flatpack (CQFP), PGA, ceramic dual in-line package (C-DIP), LCC socket or surface mount, ceramic dual in-line package (CERDIP), ceramic quadpack (CERQUAD), small outline package gull wing (SOP), small outline package J-lead (SOJ), thin small outline package (TSOP) etc. and may have any of various types of connectivity including pin grid array (PGA), ball grid array (BGA), direct chip attach (DCA), metal bands or pins etc. Also usable is the controlled collapse chip connection (C4) method, commonly known as the "flip chip" method. Computer chip 100 utilizes a generic method for interconnecting multiple module types on a single computer chip 100 using intelligent buffering and a universal port design. Connecting each module to a communications pathway with a full duplex, general purpose communications port allows for heterogeneous and homogeneous module types to form a networked system on a single computer chip. The present invention allows "system on a chip" producers to integrate module designs from different sources or module core vendors. This promotes integration of "best of breed" cores from an evolving industry of "virtual component" suppliers. Further details of the components of the computer chip will be given in the descriptions of FIG. 2–5.

Figure 2:
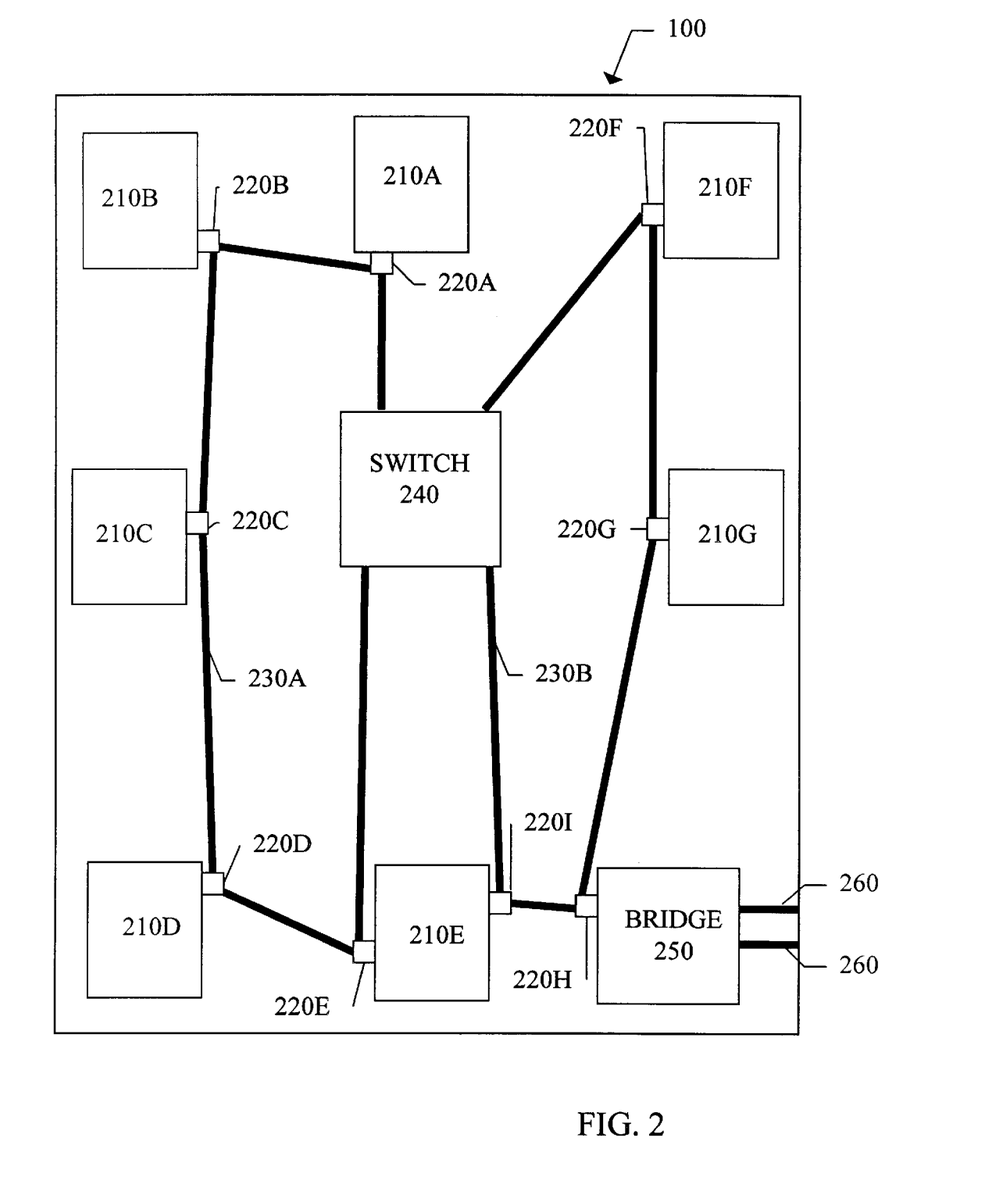
FIG. 2 illustrates an embodiment of the on-chip network shown in FIG. 1 according to the present invention.

FIG. 2—On-Chip Network

Referring now to FIG. 2, an embodiment is shown of computer chip 100 with an on-chip system for interconnecting a plurality of modules 210A–210G on a single computer chip 100 in an on-chip network. When a reference is made to module 210, that reference may refer to any of the modules 210A–210G. The components of the network preferably include a series of inter-module links 230A–230B which provide an electrical path for data communications between the plurality of modules 210 comprised on the computer chip 100. When a reference is made to inter-module link 230, that reference may refer to any part associated with inter-module link 230, including those labeled as 230A and 230B. The modules 210 preferably perform operations, and modules may be devices such as a processor, an I/O controller, or storage (memory), or a hybrid of tasks, like a task-specific hybrid (or ASIC) or a task-general hybrid. A plurality of inter-module ports 220 with at least one inter-module port 220 are coupled between an associated module and the inter-module link 230.

An inter-module network switch 240 is comprised on computer chip 100. which joins the inter-module links 230. An inter-chip network bridge 250 is comprised on computer chip 100 which is capable of joining two computer chips to extend the on-chip network through connectors 260. Inter-module links 230A combine to form a complete circuit among the inter-module ports 220A–220E through inter-module network switch 240, and inter-module links 230B combine to form a complete circuit among the inter-module ports 220F–220I also through inter-module network switch 240. In addition, the inter-module network switch 240 joins the two inter-module link networks 230A and 230B.

Starting at the top center of FIG. 2 and moving counter-clockwise, modules 210A–210E, each with associated module 220A–220E, are electrically connected in an on-chip communications network by inter-module links 230A. The communications circuit is completed by inter-module network switch 240 in the center of the computer chip 100. The inter-module network switch 240 also completes a second communications circuit involving inter-module links 230B. The on-chip communications network includes, moving clockwise from the top center again, modules 210F–210G, with associated inter-module ports 220F–220G, followed by inter-chip network bridge 250 coupled to the on-chip network by associated inter-module port 220H and a second connection to module 210E via inter-module port 220I. An inter-module link 230B to inter-module network switch 240 inter-module port 220I completes the circuit.

Some modules 210, like special case module 210E, may be connected to more than one inter-module link 230 via multiple inter-module ports 220, as shown by the connection of module 210E to inter-module link 230A via inter-module port 220E and to inter-module link 230B via inter-module port 220I.

The plurality of inter-module ports 220 provide a common interface to each of their associated modules 210. The inter-module port 220 is universal so that any design of module 210 of any type may be connected to any of the inter-module ports 220. Furthermore, each of the inter-module ports 220 operates to (i) receive data from the inter-module link 230, (ii) determine if the data from the inter-module link 230 is addressed to the associated module 210, (iii) provide the data from the inter-module link 230 to the associated module 210 if the inter-module port 220 determines that the data from the inter-module link 230 is addressed to the associated module 210, (iv) accept data from the associated module 210 for transmission on the inter-module link 230, and (v) transmit the data from the associated module 210 on the inter-module link 230.

Figure 3:
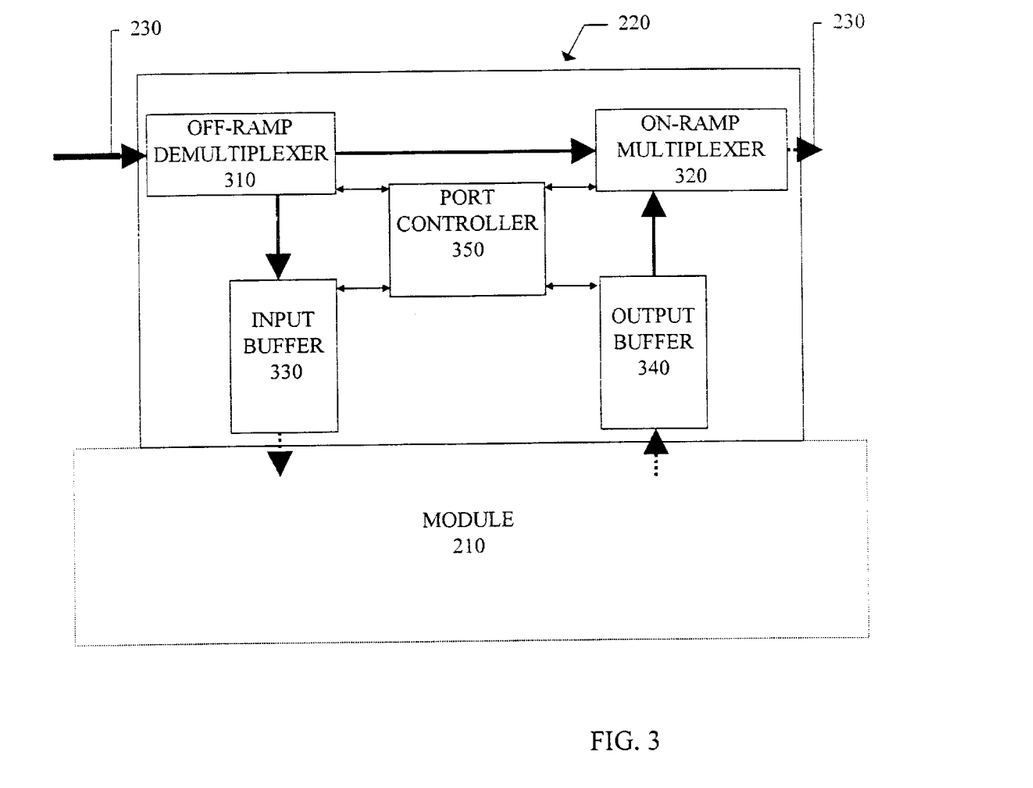
FIG. 3 illustrates an inter-module port according to the present invention.

FIG. 3—Inter-Module Port

Referring now to FIG. 3, an embodiment is shown of the internal details of an inter-module port 220 for coupling a module 210 comprised on a computer chip 100 to an inter-module link 230 for receiving and sending communications between one or more additional modules 210 comprised on the computer chip 100. The inter-module port 220 preferably includes an "off-ramp" demultiplexer 310 for coupling to the inter-module link 230 providing for the off-ramp demultiplexer 310 receiving data from the inter-module link 230. An "on-ramp" multiplexer 320 couples to the inter-module link 230 and provides data onto the inter-module link 230. The on-ramp multiplexer 320 further couples to the off-ramp demultiplexer 310, and the off-ramp demultiplexer 310 operates to provide data to the on-ramp multiplexer 320 for "through traffic". An input buffer 330 couples to the off-ramp demultiplexer 310, and the input buffer 330 includes connections (not shown) for coupling to the module 210. An output buffer 340 couples to the on-ramp multiplexer 320, and the output buffer 340 also includes connections (not shown) for coupling to the module 210.

The off-ramp demultiplexer 310 operates to receive data from the inter-module link 230 and demultiplex a portion of the data intended for the module 210 and provide the portion of the data intended for the module 210 to the input buffer 330. The input buffer 330 operates to receive and store the portion of the data intended for the module 210 and provide the portion of the data intended for the module 210 to the module 210 as the module 210 signals a readiness to accept the data. The output buffer 340 operates to receive and store output data from the module 210 and provide the data from the module 210 to the on-ramp multiplexer 320. The on-ramp multiplexer 320 operates to receive the output data from the module 210 and multiplex the data from the module 210 with other data received from the off-ramp demultiplexer 310 to form multiplexed data. The on-ramp multiplexer 320 further operates to provide the multiplexed data to the inter-module link 230.

The inter-module port 220 preferably also includes a port controller 350 coupled to control the operations of the off-ramp demultiplexer 310, the on-ramp multiplexer 320, the input buffer 330, and the output buffer 340. The means of port controller 350 may also be incorporated within the other individual components of the inter-module port 220 as desired. The preferred operation of the port controller 350 includes providing clocking signals to each of the off-ramp demultiplexer 310, the on-ramp multiplexer 320, the input buffer 330, and the output buffer 340.

As each module 210 preferably includes a unique address, the port controller 350 preferably further operates to receive addresses of received data from the off-ramp demultiplexer 310 and determine if the unique address of the module 210 is present. The port controller 350 then operates to direct the off-ramp demultiplexer 310 to provide data associated with the unique address of the module 210 to the input buffer 330 if the port controller 350 determines that the unique address of the module 210 is present. Alternatively, the address decoding logic is comprised in the off-ramp demultiplexer 310, or in specialized address decoding logic coupled to the off-ramp demultiplexer 310.

Figure 4:
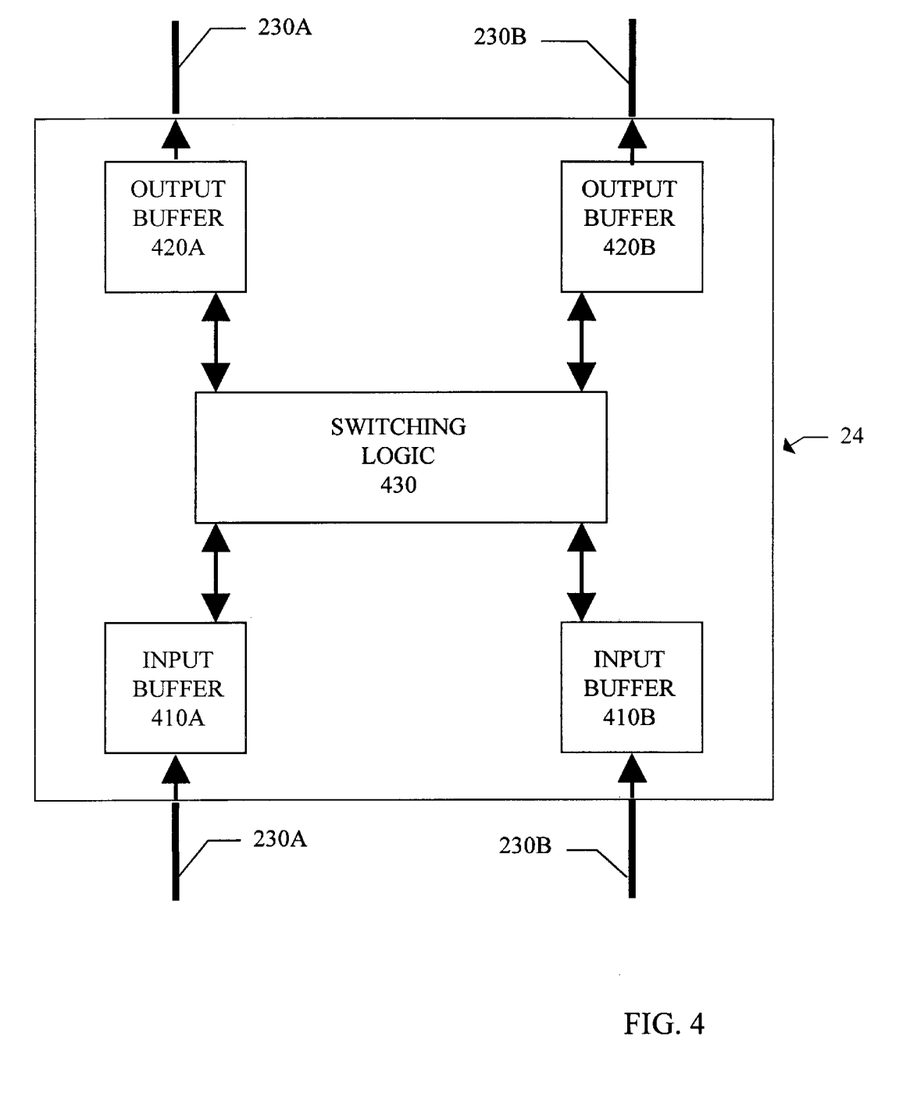
FIG. 4 illustrates an inter-module network switch according to the present invention.

FIG. 4—Inter-Module Network Switch

Referring now to FIG. 4, an inter-module network switch 240 is shown on computer chip 100. Inter-module network switch 240 couples a plurality of inter-module links 230A/230B on the computer chip 100. The inter-module network switch 240 preferably comprises a plurality of connectors (not shown) for connecting to the plurality of inter-module links 230. An input buffer 410A or 410B and an output buffer 420A or 420B couple the inter-module network switch 240 to each of the plurality of inter-module links 230A or 230B. In other words, the switch 240 includes two or more sets of input buffers and output buffers, such as a first set comprising input buffer 410A and output buffer 420A, and a second set comprising input buffer 410B and output buffer 420B. Switching logic 430 couples to each of the input buffers 410 and to each of the output buffers 420. The switching logic 430 is configured to transfer communications from a first input buffer 410 coupled to a first inter-module link 230A or 230B to a first output buffer 420 coupled to a second inter-module link 230A or 230B. A controller (not shown) is preferably coupled to or comprised in the switching logic 430 for controlling operations of the switching logic 430. The controller may also be integrated within the switching logic 430. While the illustrated inter-module network switch 240 is only a 2×2 switch, i.e. two inputs and two outputs, any size N×N inter-module network switch 240 is contemplated.

Preferably, the plurality of connectors includes a first subset of connectors which only receive data and a second subset of connectors which only transmit data. The first subset of connectors couple to a first plurality of inter-module links 230 which provide data to the first subset of connectors. The second subset of connectors couple to a second plurality of inter-module links 230 which receive data from the second subset of connectors.

The controller preferably operates to control the transfer of communications or data from the input buffer 410 coupled to the first inter-module link 230 to the output buffer 420 coupled to the second inter-module link 230. Preferably, the communications include a data packet with an associated address which uniquely identifies a destination address for the data packet. The controller preferably operates to read the associated address, determine the destination for the data packet, and direct the switching logic 430 to route the data packet to the destination via the appropriate inter-module link 230.

As an example of the preferred operation of the inter-module network switch 240, an incoming data packet on inter-module link 230A is accepted by input buffer 410A. The switching logic 430, or a controller (not shown) coupled to the switching logic 430, reads the destination address associated with the incoming data packet and determines the route to the destination module. The controller directs the switching logic 430 to accept the incoming data packet from input buffer 410A and then transfer the incoming data packet to either output buffer 420A if the destination module is on inter-module link 230A or output buffer 420B if the destination module is on inter-module link 230B. For purposes of this example, assume that the destination address is associated with a module connected to inter-module link 230B. Upon receipt of the now outgoing data packet, output buffer 420B transfers the outgoing data packet to inter-module link 230B as bandwidth becomes available. An incoming data packet on inter-module link 230B or a destination address associated with inter-module link 230A allow for similar movement of the data packet through the inter-module network switch 240 by way of the appropriate elements.

Figure 5:
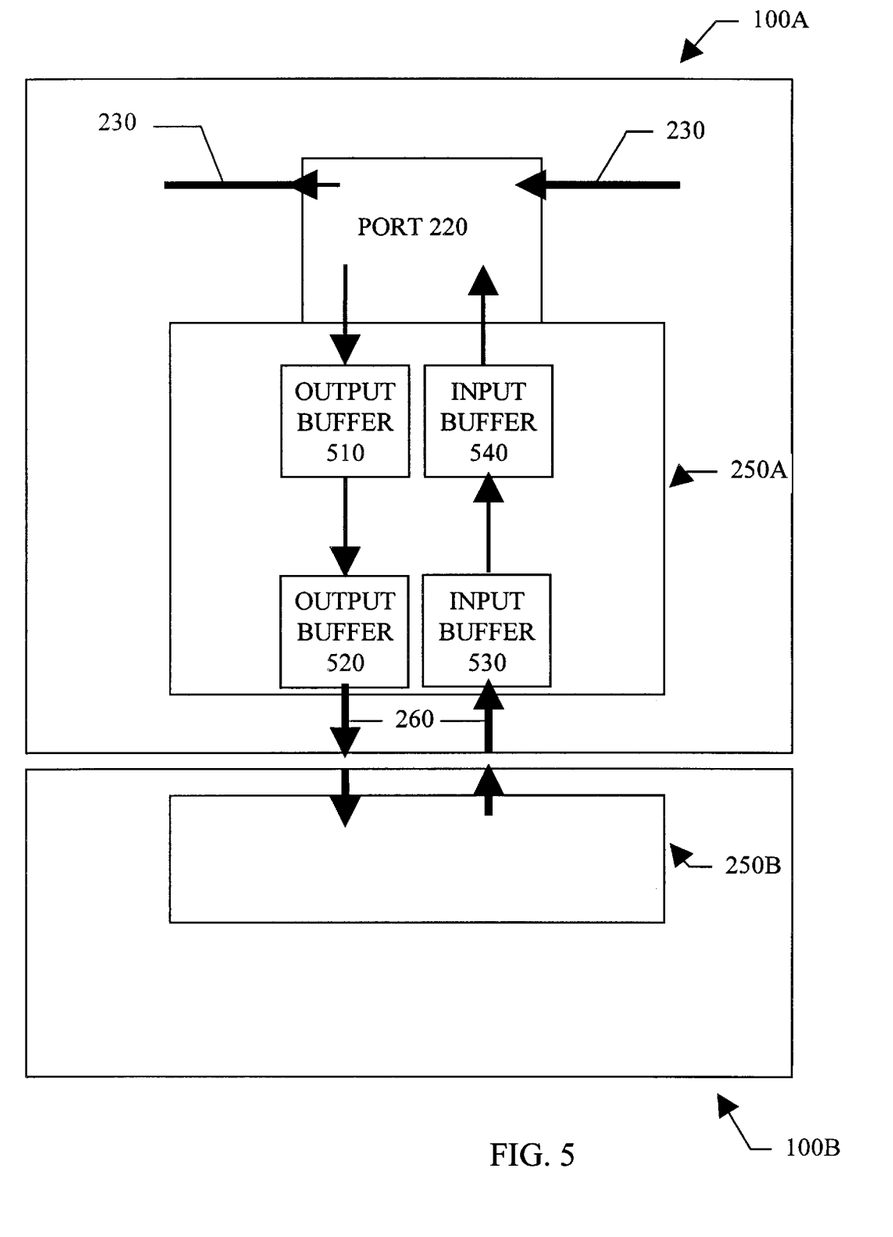
FIG. 5 illustrates an inter-chip network bridge switch according to the present invention.

FIG. 5—Inter-Chip Network Bridge

Referring now to FIG. 5, an associated pair of inter-chip network bridges 250A/B are shown on associated computer chips 100A/B. The inter-chip network bridge 250A couples the associated computer chip 100A to a second computer chip 100B by connecting to a second inter-chip network bridge 250B via a set of included inter-chip connectors 260.

The figure is shown not to scale and only the details of inter-chip network bridge 250A are shown. Inter-chip network bridge 250B is similar to inter-chip network bridge 250A.

Inter-chip network bridge 250A preferably includes one or more output buffers 510/520 which operate to accept outgoing data destined for an address on the second computer chip 100B and one or more input buffers 530/540 operable to receive incoming data destined for an associated address on the associated computer chip 100A. Although shown as double buffered, a single buffer or other buffering scheme may also be used. Preferably the buffers are first in, first out (FIFO) or configurable. Switching or buffer control logic (not shown) couples to each of the output buffers and to each of the input buffers. The switching logic operates to transfer the outgoing data from an output buffer 520 to the second computer chip 100B as well as further operating to receive the incoming data from the second computer chip 100B into a first input buffer 530. A controller (not shown) couples to control the operations of the switching logic. The controller may also be integrated into the switching logic.

The plurality of connectors 260 preferably include a first subset of connectors which only receive the incoming data and a second subset of connectors which only transfer the outgoing data. The first subset of connectors operate to couple to a first plurality of connectors comprised on the second computer chip 100B which are configured to provide the incoming data to the first subset of connectors. The second subset of connectors operate to couple to a second plurality of connectors comprised on the second computer chip 100B which are configured to receive the incoming data from the first subset of connectors.

Inter-module port 220 accepts data from inter-module link 230 that is to be transferred from computer chip 100A to computer chip 100B. The inter-chip network bridge 250A accepts data to be transferred to computer chip 100B into input buffer 510 when space within the input buffer 510 is available. Data are transferred to output buffer 520 when space within the output buffer 520 is available. The data in output buffer 520 is transferred to the inter-chip network bridge 250B on computer chip 100B through included inter-chip connectors 260 when inter-chip network bridge 250B on computer chip 100B signals availability to accept additional data from inter-chip network bridge 250A on computer chip 100A.

Conclusion

Therefore, the present invention comprises an improved system for connecting modules on an integrated circuit in an on-chip network. Although the system of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A system for interconnecting a plurality of modules on a single computer chip in an on-chip network comprising:
   a inter-module link providing an electrical path for data communication;
   a plurality of modules comprised on said chip, wherein each of said plurality of modules is different;
   a plurality of inter-module ports, wherein at least one inter-module port is coupled between an associated module and said inter-module link;
   wherein said inter-module link electrically couples said inter-module ports, wherein said inter-module link is configured to provide a communications pathway between said modules;
   wherein each of said plurality of inter-module ports provide a common interface to each of said associated modules and to said inter-module link;
   wherein said each of said plurality of inter-module ports is configured to be connectable to any of said plurality of modules on a side of said inter-module port opposite a side coupled to said inter-module link.

2. The system of claim 1,
   wherein each of said inter-module ports is operable to (i) receive data from said inter-module link, (ii) determine if said data from said inter-module link is addressed to said associated module, (iii) provide said data from said inter-module link to said associated module if said inter-module port determines that said data from said inter-module link is addressed to said associated module, (iv) accept data from said associated module for transmission on said inter-module link, and (v) transmit said data from said associated module on said inter-module link.

3. The system of claim 2, wherein each inter-module port includes:
   an off-ramp demultiplexer for coupling to said inter-module link, wherein said off-ramp demultiplexer receives said data from said inter-module link;
   an on-ramp multiplexer for coupling to said inter-module link and for providing data to said inter-module link, wherein said on-ramp multiplexer is further coupled to said off-ramp demultiplexer, wherein said off-ramp demultiplexer is operable to provide data to said on-ramp multiplexer;
   an input buffer coupled to said off-ramp demultiplexer, wherein said input buffer includes connections for coupling to said module;
   an output buffer coupled to said on-ramp multiplexer, wherein said output buffer includes connections for coupling to said module; and
   wherein said off-ramp demultiplexer is operable to receive said data from said inter-module link and demultiplex a portion of said data from said inter-module link which comprises data intended for said module and provide said data intended for said module to said input buffer;
   wherein said input buffer is operable to receive and store said data intended for said module and provide said data intended for said module to said module;
   wherein said input buffer is operable to receive and store data from said module and provide said data from said module to said on-ramp multiplexer;
   wherein said on-ramp multiplexer is operable to receive said data from said module and multiplex said data from said module with other data received from said off-ramp demultiplexer to form multiplexed data, wherein said on-ramp multiplexer is operable to provide said multiplexed data to said inter-module link.

4. The system of claim 2, further comprising:
   an inter-module network switch for coupling a plurality of inter-module links.

5. The system of claim 4, wherein said inter-module network switch includes,
   a plurality of connectors for connecting to said plurality of inter-module links;
   an input buffer and an output buffer for coupling to each of said plurality of inter-module links;

switching logic coupled to each of said input buffers and coupled to each of said output buffers, wherein said switching logic is configured to transfer communications from a first input buffer coupled to a first inter-module link to a second output buffer coupled to a second inter-module link; and a controller coupled to said switching logic for controlling operations of said switching logic.

6. The system of claim 5, wherein said plurality of connectors includes a first subset of connectors designed to only receive data, wherein said plurality of connectors includes a second subset of connectors designed to only transmit data;

wherein said first subset of connectors couple to a first plurality of inter-module links which provide data to said first subset of connectors;

wherein said second subset of connectors couple to a second plurality of inter-module links which provide data to said second subset of connectors.

7. The system of claim 6, wherein said controller is operable to control transfer data from said first input buffer coupled to said first inter-module link to said second output buffer coupled to said second inter-module link.

8. The system of claim 7, wherein said communications include a data packet with an associated address which uniquely identifies a for said data packet, and wherein said controller is operable to read said associated address, determine said destination for said data packet, and direct said switching logic to route said data packet to said destination.

9. The system of claim 4, further comprising:

an inter-chip network bridge for coupling two computer chips.

10. The system of claim 9, wherein said inter-chip network bridge includes:

a plurality of connectors for coupling to a plurality of corresponding connectors comprised on said second computer chip;

one or more output buffers operable to accept outgoing data destined for an address on said second computer chip;

one or more input buffers operable to receive incoming data destined for an associated address on said associated computer chip;

a switching logic coupled to each of said output buffers, wherein said switching logic is further coupled to each of said input buffers, wherein said switching logic is operable to transfer said outgoing data from a first output buffer to said second computer chip, wherein said switching logic is further operable to receive said incoming data from said second computer chip into a first input buffer; and a controller coupled to control said switching logic.

11. The system of claim 10, wherein said plurality of connectors includes a first subset of connectors designed to only receive said incoming data, wherein said plurality of connectors includes a second subset of connectors designed to only transfer said outgoing data;

wherein said first subset of connectors are operable to couple to a first plurality of connectors comprised on said second computer chip which are configured to provide said incoming data to said first subset of connectors;

wherein said second subset of connectors are operable to couple to a second plurality of connectors comprised on said second computer chip which are configured to receive said incoming data from said first subset of connectors.

12. The system of claim 1, wherein each of said plurality of modules is selected from a group including a processor, a memory, an I/O controller, an inter-chip network bridge, a task-specific hybrid, and a task-general hybrid.

13. The system of claim 1, wherein said inter-module link is operable to transmit data on only one direction.

14. An on-chip inter-module port for coupling a module comprised on a computer chip to an inter-module link comprised on said computer chip for communications between a plurality of modules comprised on said computer chip, said inter-module port comprising:

an off-ramp demultiplexer for coupling to said inter-module link, wherein said off-ramp demultiplexer receives data from said inter-module link;

an on-ramp multiplexer for coupling to said inter-module link and for providing data onto said inter-module link, wherein said on-ramp multiplexer is further coupled to said off-ramp demultiplexer, wherein said off-ramp demultiplexer is operable to provide data to said on-ramp multiplexer;

an input buffer coupled to said off-ramp demultiplexer, wherein said input buffer includes connections for coupling to said module;

an output buffer coupled to said on-ramp multiplexer, wherein said output buffer includes connections for coupling to said module; and wherein said off-ramp demultiplexer is operable to receive data from said inter-module link and demultiplex a portion of said data intended for said module and provide said portion of said data intended for said module to said input buffer;

wherein said input buffer is operable to receive and store said portion of said data intended for said module and provide said portion of said data intended for said module to said module;

wherein said input buffer is operable to receive and store data from said module and provide said data from said module to said on-ramp multiplexer;

wherein said on-ramp multiplexer is operable to receive said data from said module and multiplex said data from said module with other data received from said off-ramp demultiplexer to form multiplexed data, wherein said on-ramp multiplexer is operable to provide said multiplexed data to said inter-module link;

wherein said inter-module port provides a common interface to each of said plurality of modules;

wherein a module of different types is connectable to said inter-module port on a side of said inter-module port opposite a side coupled to said inter-module link.

15. The on-chip inter-module port of claim 14, further comprising:

a port controller coupled to control said operations of said off-ramp demultiplexer, said on-ramp multiplexer, said input buffer, and said output buffer.

16. The on-chip inter-module port of claim 15, wherein said port controller provides clocking signals to each of said off-ramp demultiplexer, said on-ramp multiplexer, said input buffer, and said output buffer.

17. The on-chip inter-module port of claim 15, wherein data received from said inter-module link includes addresses, wherein said module has a unique address;

wherein said port controller is operable to receive addresses of received data from said off-ramp demultiplexer and determine if said unique address of said module is present;

wherein said port controller is operable to direct said off-ramp demultiplexer to provide data associated with said unique address of said module to said input buffer if said port controller determines that said unique address of said module is present.

18. The on-chip inter-module port of claim 15, wherein data received from said inter-module link includes addresses, wherein said module has a unique address;

wherein said off-ramp demultiplexer is operable to receive addresses of received data from said inter-module link and determine if said unique address of said module is present;

wherein said off-ramp demultiplexer is operable to provide data associated with said unique address of said module to said input buffer if said off-ramp demultiplexer determines that said unique address of said module is present.

19. A system for interconnecting a plurality of modules on a single computer chip in an on-chip network comprising:

an inter-module link comprised on said chip providing an electrical path for data communication;

a plurality of modules comprised on said chip, wherein each of said modules perform operations and/or store data, wherein at least one of said plurality of modules is a processor, and wherein at least one of said plurality of modules is a memory;

a plurality of inter-module ports comprised on said chip, wherein at least one inter-module port is coupled between an associated module and said inter-module link;

wherein said inter-module link electrically couples said inter-module ports, wherein said inter-module link is configured to provide a communications pathway between said modules;

wherein each of said plurality of inter-module ports provides a common interface to each of said associated modules;

wherein modules of different types are connectable to any of said inter-module ports on a side of said inter-module port opposite a side coupled to said inter-module link.

20. The system of claim 19, wherein said inter-module link is configured to transport a plurality of data items concurrently.

21. The system of claim 19, wherein each of said inter-module ports is operable to (i) receive data from said inter-module link, (ii) determine if said data from said inter-module link is addressed to said associated module, (iii) provide said data from said inter-module link to said associated module if said inter-module port determines that said data from said inter-module link is addressed to said associated module, (iv) accept data from said associated module for transmission on said inter-module link, and (v) transmit said data from said associated module on said inter-module link.

22. The system of claim 21, wherein each inter-module port includes:

an off-ramp demultiplexer on said chip for coupling to said inter-module link, wherein said off-ramp demultiplexer receives said data from said inter-module link;

an on-ramp multiplexer on said chip for coupling to said inter-module link and for providing data to said inter-module link, wherein said on-ramp multiplexer is further coupled to said off-ramp demultiplexer, wherein said off-ramp demultiplexer is operable to provide data to said on-ramp multiplexer;

an input buffer on said chip coupled to said off-ramp demultiplexer, wherein said input buffer includes connections for coupling to said module;

an output buffer on said chip coupled to said on-ramp multiplexer, wherein said output buffer includes connections for coupling to said module; and wherein said off-ramp demultiplexer is operable to receive said data from said inter-module link and demultiplex a portion of said data from said inter-module link which comprises data intended for said module and provide said data intended for said module to said input buffer;

wherein said input buffer is operable to receive and store said data intended for said module and provide said data intended for said module to said module;

wherein said input buffer is operable to receive and store data from said module and provide said data from said module to said on-ramp multiplexer;

wherein said on-ramp multiplexer is operable to receive said data from said module and multiplex said data from said module with other data received from said off-ramp demultiplexer to form multiplexed data, wherein said on-ramp multiplexer is operable to provide said multiplexed data to said inter-module link.

23. The system of claim 19, further comprising:

an inter-module network switch on said chip for coupling a plurality of inter-module links.

24. The system of claim 23, wherein said inter-module network switch includes:

a plurality of connectors on said chip for connecting to said plurality of inter-module links on said chip;

an input buffer on said chip and an output buffer on said chip for coupling to each of said plurality of inter-module links;

switching logic on said chip coupled to each of said input buffers and coupled to each of said output buffers, wherein said switching logic is configured to transfer communications from a first input buffer coupled to a first inter-module link to a second output buffer coupled to a second inter-module link; and a controller on said chip coupled to said switching logic for controlling operations of said switching logic.

25. The system of claim 24, wherein said plurality of connectors includes a first subset of connectors designed to only receive data, wherein said plurality of connectors includes a second subset of connectors designed to only transmit data;

wherein said first subset of connectors couple to a first plurality of inter-module links which provide data to said first subset of connectors;

wherein said second subset of connectors couple to a second plurality of inter-module links which provide data to said second subset of connectors.

26. The system of claim 25, wherein said controller is operable to control transfer data from said first input buffer coupled to said first inter-module link to said second output buffer coupled to said second inter-module link.

27. The system of claim 26, wherein said communications include a data packet with an associated address which uniquely identifies a for said data packet, and wherein said controller is operable to read said associated address, determine said destination for said data packet, and direct said switching logic to route said data packet to said destination.

28. The system of claim 19, further comprising:

an inter-chip network bridge on said chip for coupling said chip to a second computer chip.

29. The system of claim 28, wherein said inter-chip network bridge includes:

a plurality of connectors on said chip for coupling to a plurality of corresponding connectors comprised on said second computer chip;

one or more output buffers on said chip operable to accept outgoing data destined for an address on said second computer chip;

one or more input buffers on said chip operable to receive incoming data destined for an associated address on said chip;

a switching logic on said chip coupled to each of said output buffers, wherein said switching logic is further coupled to each of said input buffers, wherein said switching logic is operable to transfer said outgoing data from a first output buffer to said second computer chip, wherein said switching logic is further operable to receive said incoming data from said second computer chip into a first input buffer; and a controller on said chip coupled to control said switching logic.

30. The system of claim 29, wherein said plurality of connectors includes a first subset of connectors designed to only receive said incoming data, wherein said plurality of connectors includes a second subset of connectors designed to only transfer said outgoing data;

wherein said first subset of connectors are operable to couple to a first plurality of connectors comprised on said second computer chip which are configured to provide said incoming data to said first subset of connectors;

wherein said second subset of connectors are operable to couple to a second plurality of connectors comprised on said second computer chip which are configured to receive said incoming data from said first subset of connectors.

31. The system of claim 29, wherein each of said plurality of modules that is not said processor or said memory is selected from a group including another processor, another memory, an I/O controller, an inter-chip network bridge, a task-specific hybrid, and a task-general hybrid.

32. A system for interconnecting a plurality of modules on a single computer chip in an on-chip network comprising:

an inter-module link comprised on said chip for providing an electrical path for data communication;

an inter-module network switch comprised on said chip for coupling a plurality of inter-module links, wherein said inter-module network switch includes:

a plurality of connectors for connecting to said plurality of inter-module links;

an input buffer and an output buffer for coupling to each of said plurality of inter-module links;

switching logic coupled to each of said input buffers and coupled to each of said output buffers, wherein said switching logic is configured to transfer communications from a first input buffer coupled to a first inter-module link to a second output buffer coupled to a second inter-module link; and a controller coupled to said switching logic for controlling operations of said switching logic;

an inter-chip network bridge comprised on said chip for coupling two computer chips, wherein said inter-chip network bridge includes:

a plurality of connectors for coupling to a plurality of corresponding connectors comprised on said second computer chip;

one or more output buffers operable to accept outgoing data destined for an address on said second computer chip;

one or more input buffers operable to receive incoming data destined for an associated address on said associated computer chip;

a switching logic coupled to each of said output buffets, wherein said switching logic is further coupled to each of said input buffers, wherein said switching logic is operable to transfer said outgoing data from a first output buffer to said second computer chip, wherein said switching logic is further operable to receive said incoming data from said second computer chip into a first input buffer; and a controller coupled to control said switching logic;

a plurality of modules comprised on said chip, wherein at least one of said plurality of modules is a processor, and wherein at least one of said plurality of modules is a memory;

a plurality of inter-module ports comprised on said chip, wherein at least one inter-module port is coupled between an associated module and said inter-module link;

wherein each of said inter-module ports is operable to (i) receive data from said inter-module link, (ii) determine if said data from said inter-module link is addressed to said associated module, (iii) provide said data from said inter-module link to said associated module if said inter-module port determines that said data from said inter-module link is addressed to said associated module, (iv) accept data from said associated module for transmission on said inter-module link, and (v) transmit said data from said associated module on said inter-module link;

wherein each inter-module port includes:

an off-ramp demultiplexer for coupling to said inter-module link, wherein said off-ramp demultiplexer receives said data from said inter-module link;

an on-ramp multiplexer for coupling to said inter-module link and for providing data to said inter-module link, wherein said on-ramp multiplexer is further coupled to said off-ramp demultiplexer, wherein said off-ramp demultiplexer is operable to provide data to said on-ramp multiplexer;

an input buffer coupled to said off-ramp demultiplexer, wherein said input buffer includes connections for coupling to said module;

an output buffer coupled to said on-ramp multiplexer, wherein said output buffer includes connections for coupling to said module; and a port controller coupled to control said operations of said off-ramp demultiplexer, said on-ramp multiplexer, said input buffer, and said output buffer;

wherein said off-ramp demultiplexer is operable to receive said data from said inter-module link and demultiplex a portion of said data from said inter-module link which comprises data intended for said module and provide said data intended for said module to said input buffer;

wherein said input buffer is operable to receive and store said data intended for said module and provide said data intended for said module to said module;

wherein said input buffer is operable to receive and store data from said module and provide said data from said module to said on-ramp multiplexer;

wherein said on-ramp multiplexer is operable to receive said data from said module and multiplex said data from said module with other data received from said off-ramp demultiplexer to form multiplexed data, wherein said on-ramp multiplexer is operable to provide said multiplexed data to said inter-module link;

wherein said inter-module link electrically couples said inter-module ports, wherein said inter-module link is configured to provide a communications pathway between said modules;

wherein each of said plurality of inter-module ports provide a common interface to each of said associated modules;

wherein modules of different types are connectable to only of said inter-module ports on a side of said inter-module port opposite a side coupled to said inter-module link.

33. The system of claim 32, wherein at least one module of said plurality of modules is coupled to at least two of said plurality of inter-module ports.

34. The system of claim 33, wherein each of said at least two of said plurality of inter-module ports is coupled to a different one of said plurality of inter-module links.

35. A system for interconnecting a plurality of modules on a single computer chip in an on-chip network comprising:

an inter-module link comprised on said chip providing an electrical path for data communication;

a plurality of modules comprised on said chip, wherein each of said modules perform operations and/or store data, wherein at least one of said plurality of modules is a processor, and wherein at least one of said plurality of modules is a memory;

a plurality of inter-module ports comprised on said chip, wherein at least one inter-module port is coupled between an associated module and said inter-module link;

wherein said inter-module link electrically couples said inter-module ports, wherein said inter-module link is configured to provide a communications pathway between said modules;

wherein each of said plurality of inter-module ports provides a common interface to each of said associated modules;

wherein modules of different types are connectable to any of said inter-module ports; and wherein at least one module of said plurality of modules is coupled to at least two of said plurality of inter-module ports on a side of said inter-module port opposite a side coupled to said inter-module link.

* * * * *

UNITED STATES PATENT AND TRADEMARK OFFICE
CERTIFICATE OF CORRECTION

PATENT NO. : 6,018,782
DATED : January 25, 2000
INVENTOR(S) : Alfred C. Hartmann It is certified that error appears in the above-identified patent and that said Letters Patent is hereby corrected as shown below:

On the Cover Page:

After "*Attorney, Agent, or Firm--*" change "Gonley" to --Conley--.

Signed and Sealed this

Twenty-sixth Day of September, 2000

Attest:

Q. TODD DICKINSON

*Attesting Officer*  *Director of Patents and Trademarks*